Dec. 25, 1934.   R. H. ROSENBERG   1,985,695
METHOD OF CLINCHING FERRULES IN HOLLOW WHEELS
Filed Jan. 20, 1931

INVENTOR.
RALPH H. ROSENBERG
BY John P. Tarbox
ATTORNEY.

Patented Dec. 25, 1934

1,985,695

UNITED STATES PATENT OFFICE 1,985,695

METHOD OF CLINCHING FERRULES IN HOLLOW WHEELS

Ralph H. Rosenberg, Detroit, Mich., assignor to Budd Wheel Company, Philadelphia, Pa., a corporation of Pennsylvania Application January 20, 1931, Serial No. 509,899

5 Claims. (Cl. 218—29)

My invention relates to the art of the manufacture of wheels having hollow nave portions formed of opposed metal stampings. It is especially concerned with the manufacture of such a wheel in which the stampings constitute integral hub and nave portions and are welded together along central meeting edges to constitute a hollow spider closed at its inner radial end and forming in effect a single piece metal wheel body.

It has been customary in connection with such wheel bodies to reinforce the nave portion with thimbles or ferrules crimped over the opposed stampings constituting the parts of the wheel body. Such ferrules not only effect reinforcement of the wheel body, but they also serve as excellent guide and abutment means for the securing elements such as the studs and nuts which secure the wheel to a hub flange.

The problem of the effective securement of these ferrules to the opposed stampings has long been one of the most troublesome factors in connection with the production of such a wheel. Previous methods involve the securement of the ferrules to one of the stampings before the stampings are welded to each other. Such methods are subject to the objection that they require insulating means between the ferrules and the stampings and that they frequently interfere with the effective welding of the wheel parts. These ferrules are subject to burning in the welding operation and often cause a burning of the wheel at the same time. The burning of either the ferrules or the wheel proper necessitates the discard of the wheel to which the damage has occurred.

My invention involves a solution of this problem by the mechanical insertion, expanding and upsetting of a ferrule within an already completed wheel. In carrying out the method I am accordingly subjected to no danger of burning the parts, and if, perchance, a ferrule is broken in the operation of inserting and clinching it, it may be removed without any loss except the cost of the single ruined ferrule.

Other objects and advantages of my invention will be obvious from a study of the subjoined specification in the light of the attached drawing, in which.

Figure 3:
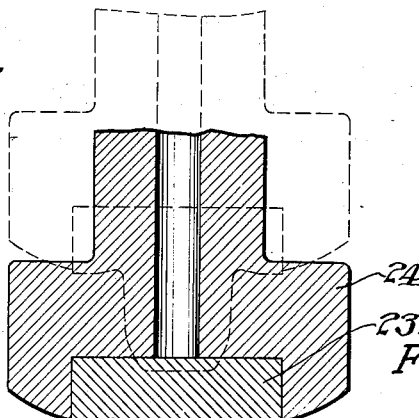
Fig. 3 is a sectional view through my apparatus indicating the final step in clinching the ferrule in place.
Figure 2:
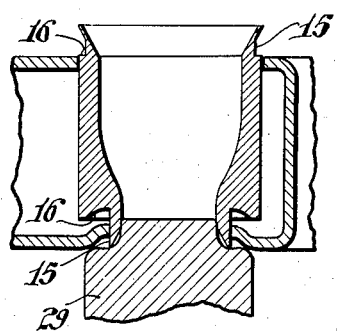
Fig. 2 is a detailed sectional view illustrating the preliminary insertion of a ferrule within the wheel body.
Figure 1:
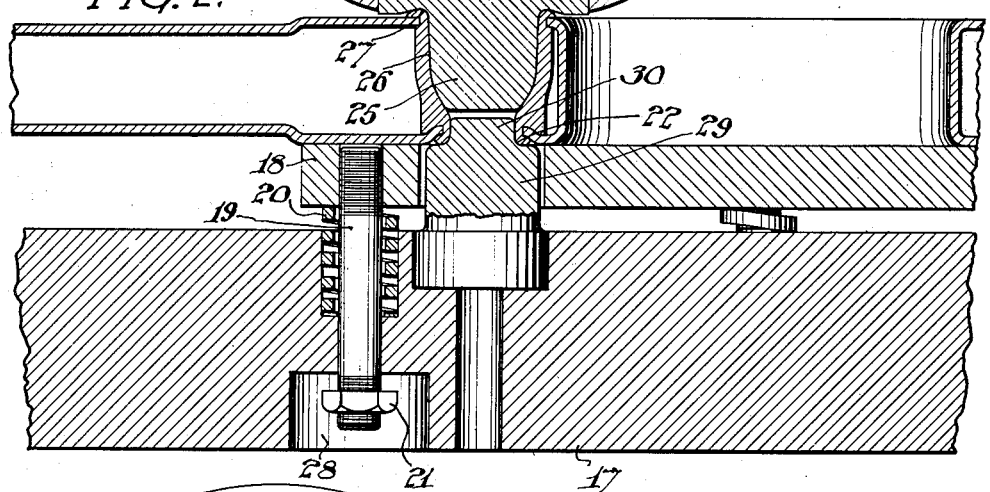
Fig. 1 is a side elevation of the wheel produced by my invention.
Figure 1:
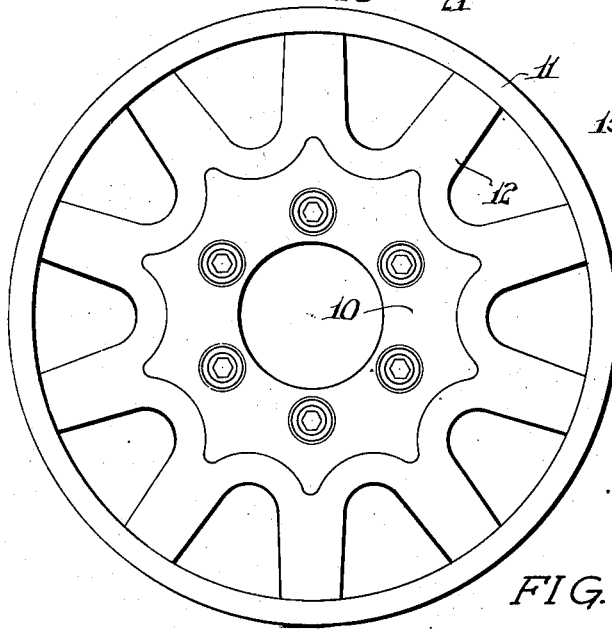
Figure 4:
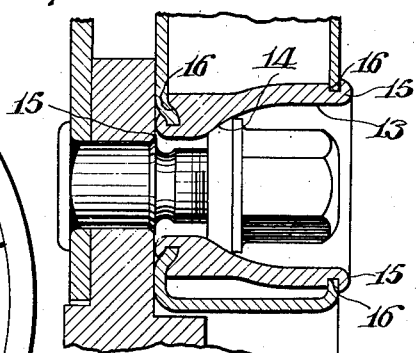
Fig. 4 is a sectional view illustrating the application of my wheel to a vehicle hub.

The wheel to which my invention is most particularly applicable is a wheel of the artillery steel type, although my improved method may find application in connection with any type of wheel in which it is found desirable to clinch a reinforcing thimble or ferrule between opposed side portions.

The artillery steel wheel illustrated in the drawing consists of a nave 10 and rim 11 interconnected by spokes 12 which are integral with the nave. In the formation of this wheel, opposed stampings in the form of spiders each corresponding in shape to one-half of the wheel body are welded together in a radial plane into a single unit. Reinforcing thimbles 13 interconnect the opposite sides of the nave portion of the wheel and serve to reinforce this portion and also provide guiding and abutment means for the securing bolts. These thimbles are longitudinally curved on their inner circumferences to provide an enlarged portion on their outer ends adapted to receive the entire body of the securing nuts and an inwardly curved portion 14 toward their inner ends adapted to provide seats for the conical faces of the nuts. The nuts are thus received entirely within the body of the thimbles. Each of the thimbles is further provided with shoulders 16 adjacent its opposite ends adapted to abut against the opposed inner faces of the stampings and with extensions 15 beyond these shoulders adapted to be curled over against the outer faces of the stampings to clinch them against the shoulders 16.

My invention consists in a method and mechanism for expanding and clinching these ferrules within an otherwise completed wheel to the body. This clinching operation presents a very difficult problem incident to the fact that the portions of the ferrules must project behind the metal surrounding the openings adapted to receive them in order to provide abutment means adapted to co-operate with the clinched ends 15 of the ferrules in securing them to the wheel body. It is therefore impossible to insert the ferrules directly into their final positions for the peening over of the outer ends thereof.

In order to obviate these difficulties I have devised a method and machine for simultaneously expanding the ferrule into a position within the nave of a wheel in which its shoulder portions 16 underlie the edges of the aligned openings which receive the ferrule, and clinching over the ends 15 of the ferrule against these underlying shoulders. My mechanism consists of a base 17 adapted to receive a floating table 18 which is normally held in elevated position with respect to the base by means of a plurality of compression springs 20 coacting with studs 19 threaded into the floating table. The studs 19 receive nuts 21 upon their lower ends and these nuts reciprocate with the studs in openings 28 in the lower side of the base 17. The nuts 21 serve as abutment means for limiting the upward movement of the floating table 18 under the action of the springs 20. A lower die 29 is received within a depression in the base 17 and is provided on its upper end with a stud 30 adapted to enter the lower end of the ferrule, the stud 30 being connected with the main body of the die through a curved portion 22 which is adapted to upset the end 15 of the ferrule when this end is forced downwardly against the die.

The upper die 23 which is adapted to coact with the die 29 in the expanding and clinching of the ferrule is carried within a vertically reciprocable head 24 for recprocation therewith. The upper die is provided at its lower end with a stud 25 adapted to enter the ferrule and is provided with a tapered portion 26 throughout its length. This stud merges into the main body of the die through a curved portion 27 adapted to turn over the upper extension 15 on the ferrule in the clinching operation.

In the practice of my process, the wheel is first placed upon the table 18 with a bolt hole in alignment with the die 29 and the stud 30 on the end of this die projecting through the lower opening in the wheel. As the table is held in slightly elevated position by the springs, no part of the wheel will rest upon any part of the die 29. While the wheel is held in this position a ferrule is inserted through the upper end thereof into a position in which its lower extension 15 projects through the opening in the lower stamping of the wheel and rests upon the top of the die 29. The head 24 is now thrust downwardly, carrying with it the die 23 and forcing the tapered portion 26 of the stud 25 of this die into the body portion of the ferrule. This movement also forces down the lower extensions 15 on the ferrule and effects a clinching over of these extensions against the wheel body and shoulders 16 at the lower end of the ferrule. Simultaneously with this clinching operation the tapered portion 26 of the die effects an expansion of the body of the ferrule into a position in which the upper shoulder 16 underlies the upper wheel stamping.

At the conclusion of the downward movement of the upper die the curved portion 27 thereof comes into contact with the upper extension 15 of the ferrule and turns this extension over against the upper stamping and upper shoulder 16. The ferrule is thus expanded into a position in which its upper shoulder underlies the upper stamping in the same operation in which the opposed ends of the ferrules are turned over against the outer faces of the opposed stampings, to coact with the shoulders in clinching the ferrule in place.

It will be apparent that I have invented a very simple and effective mechanism for effecting the securement of the ferrules in a difficult position. Modifications will be obvious to those skilled in the art and I do not accordingly wish to be limited except by the terms of my sub-joined claims as interpreted in the light of the generic spirit of my invention.

I claim:

1. A machine for securing ferrules within a hollow sheet metal structure which comprises a die adapted to enter the body portion of a ferrule to finally form a bolt seat centrally thereof and bearing a second die surface to clinch the ferrule axially outwardly of the bolt seat, and a second die adapted to cooperate with said first die to clinch the opposite end of the ferrule over the side of said sheet metal structure.

2. The method of securing a reinforcing ferrule, having a maximum diametral dimension greater than the diameter of at least one of the opposed openings through which it is secured, between the opposed faces of a hollow sheet metal structure which comprises inserting the ferrule through aligned different diameter openings in the opposed faces of said structure, and simultaneously clinching the ends of said ferrule to the side of said structure and expanding the central portion of said ferrule to form a bolt seat therein while abutting the ferrule annularly into contact with the peripheries of said openings.

3. The method of securing reinforcing ferrules, having initial maximum diametral dimensions greater than the diametral dimension of at least one of the opposed openings through which said ferrule is secured, between the opposed faces of a hollow sheet metal wheel body which comprises inserting the ferrule through the larger of different diameter aligned openings located in the opposed faces of said structure, clinching the end of said ferrule about the smaller of said openings, expanding the said ferrule to a diametral dimension greater than the diametral dimension of the other opening of said wheel body, whereby to lock a shoulder on said thimble interiorly of said wheel body and said opening, and whereby to finally form a bolt seat interiorly of said ferrule, and clinching the end of said ferrule about said opening.

4. The method of securing reinforcing ferrules between the opposed faces of a hollow sheet metal body, which ferrules are provided at their opposite ends with shoulders ultimately to abut the said opposed faces of the sheet metal body which consists in providing the ferrules beyond the shoulders with ends of reduced diameter, providing the body with apertures one at least of which is larger than the diameter of the ferrule between the shoulders, inserting the ferrule through said last mentioned opening, to a position in which the shoulder is radially juxtaposed with the face it is to abut, thereupon radially expanding the ferrule to axially juxtapose the shoulder and the surface and providing a coacting external shoulder in connection with said end of reduced diameter.

5. A machine for securing externally shouldered ferrules with their shoulders within and abutting the opposed internal opposed surfaces of a hollow sheet metal structure which comprises a die means adapted to enter an open end of the ferrule and radially expand the end to bring the shoulder in abutting relation to the internal surface of the structure and further in the same operation to clinch over the end of the ferrule to confine the metal wall upon the abutting shoulder.

RALPH H. ROSENBERG.